United States Patent [19]

Watanabe et al.

[11] Patent Number: 4,907,112
[45] Date of Patent: Mar. 6, 1990

[54] RECORDING/REPRODUCING HEAD PROVIDING EVENLY DISTRIBUTED CONTACT PRESSURE WITH MAGNETIC MEDIUM

[75] Inventors: Wataru Watanabe; Takashi Ichiyanagi, both of Osaka, Japan

[73] Assignee: Matsushita Electric Industrial Co., Ltd., Kadoma, Japan

[21] Appl. No.: 165,733

[22] Filed: Mar. 9, 1988

[30] Foreign Application Priority Data

Mar. 9, 1987 [JP] Japan ................................ 62-53338

[51] Int. Cl.$^4$ .......................... G11B 5/48; G11B 21/20
[52] U.S. Cl. ................................. 360/104; 360/130.34
[58] Field of Search ............... 360/104, 102, 103, 105, 360/106, 109, 130.3, 130.34, 99.01, 97.01

[56] References Cited

U.S. PATENT DOCUMENTS 4,074,331  2/1978  O'Reilly et al. ..................... 360/104
4,796,129  1/1989  Umebayashi et al. ......... 360/130.34

FOREIGN PATENT DOCUMENTS 0214597    3/1987   European Pat. Off. ............ 360/104
54-43710   4/1979   Japan .
57-44255   3/1982   Japan .
60-43257   3/1985   Japan .
60-83279   5/1985   Japan .
60-243867  12/1985  Japan .
62-52759   3/1987   Japan .

OTHER PUBLICATIONS

"Compliant Head Mounting", by Grometer et al; IBM Technical Bulletin, vol. 5, No. 1, Jun. 1962.

Primary Examiner—Stuart N. Hecker
Assistant Examiner—David J. Severin
Attorney, Agent, or Firm—Cushman, Darby & Cushman

[57] ABSTRACT

A magnetic recording/reproducing apparatus for recording information on a disc-like recording medium and/or for reproducing the recorded information therefrom. The magnetic recording/reproducing apparatus has a pair of magnetic head devices each composed of a magnetic head chip and a sliding pad for slidably holding the disc-like recording medium therebetween under a predetermined contact pressure. The magnetic head chip is surrounded at a predetermined interval by the sliding pad and the top portion of the magnetic head chip is disposed so as to protrude by a predetermined amount from a sliding surface of the sliding pad which comes into contact with the said disc-like recording medium. The pair of recording head devices are aligned with each other with the disc-like recording medium being held therebetween so that the magnetic head chips are arrranged at different positions at the same interval with respect to the sliding pads in a radial direction of the disc-like recording medium. When the interval from each of the magnetic head chips to each of the sliding pads is a and the interval between said magnetic head chips is b, the positions of the magnetic head chips with respect to the sliding pads are determined so as to satisfy the following relation, $b/2 \leq a \leq b$.

5 Claims, 2 Drawing Sheets

RECORDING/REPRODUCING HEAD PROVIDING EVENLY DISTRIBUTED CONTACT PRESSURE WITH MAGNETIC MEDIUM

RELATED APPLICATION

This application relates to co-pending U.S. application Ser. No. 902,953, titled "Magnetic Recording And Reproducing Device" assigned to the same assignee as the present invention.

BACKGROUND OF THE INVENTION

The present invention relates generally to magnetic recording/reproducing apparatus, and more particularly to such a magnetic recording/reproducing apparatus which allows magnetic recording/reproducing of information on and from both sides of a flexible recording medium (which will be referred to as floppy disc).

Various devices and systems have been devised heretofore to allow magentic recording/reproducing of information on and from both surfaces of a floppy disk. One known arrangement is that a floppy disc is sandwiched between a pair of head-sliders each having a recording head which comes into contact with one surface of the floppy disk under a predetermined pressure for magnetic recording/reproducing process. An important problem in such a both-side recording/reproducing system relates to the need that the contact of the recording heads thereof with both the surfaces of the floppy disc is made appropriately. That is, the recording/reproducing characteristics significantly depends upon whether the contact is proper or not. Therefore, in the case where the floppy disc is imperfect in flatness, favorable recording and/or reproduction can not be effected due to the floppy disc being not satisfactorily brought into contact with the recording heads and this problem becomes remarkably conspicuous in the case where the recording density is increased in accordance with recent requirements in industrial fields.

SUMMARY OF THE INVENTION

It is therefore an object of the present invention to provide a further improved magnetic recording/reproducing apparatus which more perfectly affects the contact of the recording heads with a floppy disc.

A magnetic recording/reproducing apparatus according to the present invention has a pair of magnetic head devices each composed of a magnetic head chip and a sliding pad for slidably holding the disc-like recording medium therebetween under a predetermined contact pressure. The magnetic head chip is surrounded at a predetrmined interval by the sliding pad and the top portion of the magnetic head chip is disposed so as to protrude by a predetermined amount from a sliding surface of the sliding pad which comes into contact with said disc-like recording medium. The pair of recording head devices are aligned with each other with the disc-like recording medium being held therebetween so that the magnetic head chips are arranged at different positions at the same interval with respect to the sliding pads in a radial direction of the disc-like recording medium. A feature of the present invention is that, when the interval from each of the magnetic head chips to each of the sliding pads is a and the interval between said magnetic head chips is b, the positions of the magnetic head chips with respect to the sliding pads are determined so as to satisfy the following relation, $$b/2 \leq a \leq b.$$

By employing the recording head devices having the above-mentioned feature, it beomes possible to achieve an accurate and stable contact of magnetic head chips with a disc-like recording medium irrespective of warps of the disc-like recording medium and slight slippage of the alignment of the pair of recording head devices with each other, resulting in allowance of high-density recording/reproduction.

BRIEF DESCRIPTION OF THE DRAWINGS

The present invention will be described in further detail with reference to the accompanying drawings, in which.

DETAILED DESCRIPTION OF THE INVENTION

Figure 1:
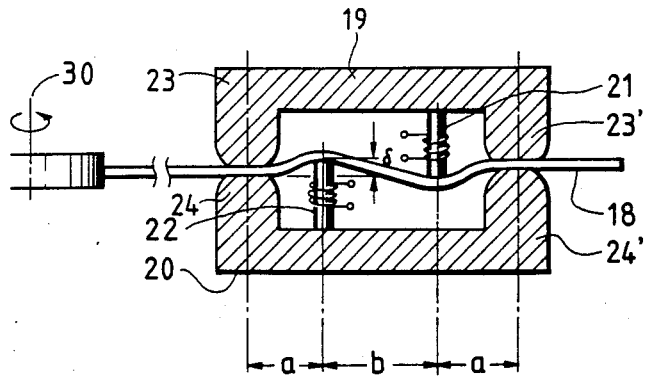
FIG. 1 is a side cross-sectional view showing a recording/reproducing apparatus according to an embodiment of the present invention which is in contact relation to a floppy disc.
Figure 3:
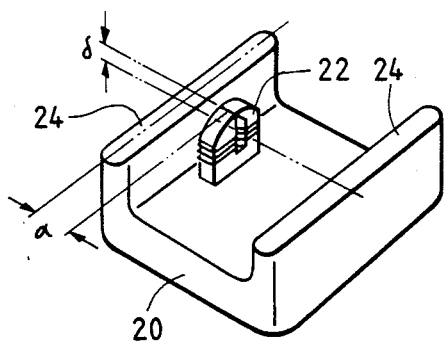
FIG. 3 is a perspective view showing a recording head device used in of the invention.

Referring now to the drawings, FIG. 1 illustrates a recording/reproducing apparatus according to an enbodiment of the present invention which is in contact relation to a floppy disc 18 whose surfaces are coated by such a magnetic material as $\gamma$-$Fe_2O_3$ or the like and which is driven rotatably about a shaft 30 when recorded and reproduced. The recording/reproducing apparatus comprises a pair of recording head devices 19 and 20 each including a magnetic head chip 21 or 22 and a pair of sliding pads 23 and 23' or 24 and 24' which are coupled to each other so as to provide the magnetic head chip 21 or 22 in parallel thereto, as illustrated in FIG. 3. The sliding pads 23, 23' 24 and 24' are respectively made of a ceramic material such as barium titanate having an excellent wear resistance characteristic and ground smoothly at its contact surfaces with the floppy disc 18 so as not to damage the floppy disc 18 through the sliding contact therewith. In position relation therebetween, the sliding pads 23, 23' 24 and 24' are so disposed as to place the magnetic head chips 21 and 22 therebetween at predetermined intervals in the radial direction of the floppy disc 18 and are so designed that the magenetic head chips 21 and 22 protrude at their top portions by a predetermined amount $\delta$ from the contact surfaces of the sliding pads 23, 23', 24 and 24' with the floppy disc 18. As illustrated in FIG. 1, the magnetic head chips 21 and 22 are symmetrically located at different positions in the radial direction of the floppy disc 18 so as not to face each other at their top portions when the pair of recording head devices 19 and 20 are combined with each other with the floppy disc 18 being sandwiched therebetween. The contact pressure produced between the pair of recording head devices 19 and 20 perpendicularly to both surfaces of the floppy disc 18 causes warps of the floppy disc 18 resulting from the protrusions of the magnetic head chips 21 and 22 with respect to the top portions of the sliding pads 23, 23' 24 and 24'. Here, a feature of this embodiment of the invention is that the magnetic head chips 21 and 22 are arranged so as to be in position relation to the sliding pads 23, 23' 24 and 24'. That is, with the floppy disc 18 being sandwiched between the pair of recording head devices 19 and 20, the magnetic head chip 22 is positioned apart by an amount δ from the sliding pad 24 in a radial direction of the floppy disc 18 and on the other hand the magnetic head chip 21 is positioned apart by the same amount δ from the sliding pad 23' in the reverse radial direction of the floppy disc 18 so that both the magnetic head chips 21 and 22 are separated by an amount b from each other. The sliding pad 24 is at a shorter distance from the center of the floppy disc 18 as compared with the position of another pad 24' and the sliding pad 23' is at a longer distance from the center of the floppy disc 18 with respect to the sliding pad 23. The intervals a and b are determined so as to be in a relation of b/2<a<b. This condition will be become apparent as the following description proceeds.

Figure 2A:
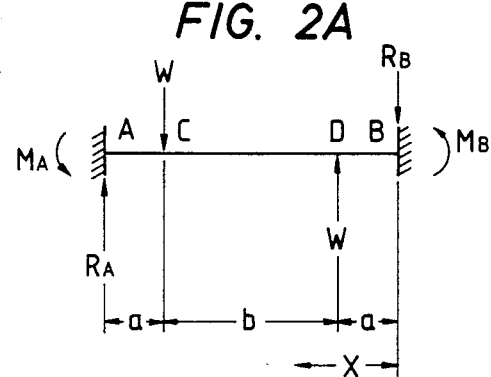
FIGS. 2A and 2B are illustrations for describing the dynamic relationship between the recording/reproducing apparatus and the floppy disc.
Figure 2B:
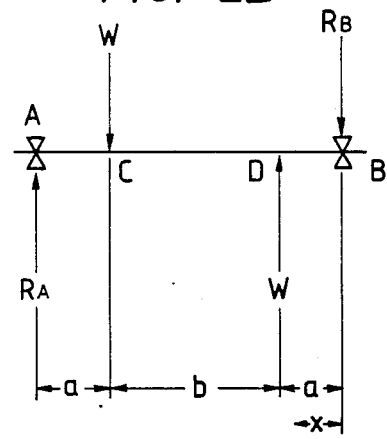

FIGS. 2A and 2B are two-dimensional dynamic model illustrations. Of these illustrations, FIG. 2A shows the case that both ends of a beam are in the fully fixed supporting state and FIG. 2B shows the case that both ends of a beam are in the simple supporting state. In FIGS. 2A and 2B, characters W represent head loads applied due to the magnetic head chips 21 and 22, characters $M_A$ and $M_B$ designate moments produced because of the contact of the floppy disc 18 with the sliding pads 23 to 24' with a predetermined contact stress, and characters $R_A$ and $R_B$ represent reaction forces generated thereby. Characters a and b respectively correspond to the intervals a and b in FIG. 1 and a line A-B represents a floppy disc. In FIG. 2A, under the condition of equilibrium of statics and the condition of deformation for deflection and so on, the relations between $M_A$, $M_B$ and $R_A$, $R_B$ can be expressed respectively as follows:

$$M_A = \frac{2}{3} aW = -M_B \quad (1)$$

$$R_A = \frac{bW}{2a+b} \quad (2)$$

Furthermore, the deflection angle i of the floppy disc between the points C and D can be expressed as follows at a distance x from the point B:

$$i = \frac{aW}{EI}\left(\frac{1}{2a+b}x^2 - \frac{1}{3}x\right) \quad (3)$$

where character E represents a Young's modulus of the floppy disc and character I designates a geometrical moment of inertia.

In the above-equation (3), the condition for i=0 at the head load point, i.e., x=a, is a=b.

On the other hand, in FIG. 2B, under the condition of equilibrium of statics, the relation between $R_A$ and $R_B$ can be expressed as the following equation (4).

$$R_A = \frac{bW}{2a+b} \quad (4)$$

Furthermore, the deflection angle i of the floppy disc between the points B and D can be expressed as the following equation (5) at distance x from the point B.

$$i = \frac{bW}{2(2a+b)EI}\left(x^2 - \frac{a(a+b)}{3}\right) \quad (5)$$

where character E represents a Young's modulus of the floppy disc and character I designates a geometrical moment of inertia.

In the above-equation (5), the condition for i=0 at the head load point, i.e., x=a, is a=b/2.

Here, the two-dimensional dynamic model of the magnetic recording/reproducing apparatus of FIG. 1 with respect to the floppy disc is positioned between the models shown in FIGS. 2A and 2B, and therefore, the condition for realizing i=0 in this case can be obtained as follows:

$$\frac{b}{2} \leq a \leq b \quad (6)$$

In other words, when the relation between a and b is determined so as to satisfy the equation (6), it is possible to result in i=0.

The condition of i=0 means that in FIG. 1 the magnetic head chip 21 or 22 comes at its top into contact with the floppy disc 18 and the gap defined at the top of the magnetic head chip 21 or 22 is accurately brought into contact with the floppy disc 18. That is, the satisfication of the equation (6) causes an excellent contact between the magnetic head chips and the floppy disc.

On the other hand, the contact pressures of the magnetic head chips 21 and 22 with the surfaces of the floppy disc 18 in FIG. 1 for recording and/or reproduction result from deformation resistances produced when the magnetic head chips 21 and 22 press down the floppy disc 18 by the amount 6. That is, the contact pressure substantially depends upon the deformation resistances, protruding amount 6, distance b between the magnetic head chips 21 and 22, and distances -a between the magnetic head chips 21, 22 and the slider pads 23 to 24', and therefore, an accurate determination of these factors allows prevention from being subjected to the influence of external factors such as warp of the floppy disc 18 and provides a stable contact therewith and hence permits the high-density magnetic recording and reproduction.

Figure 4:
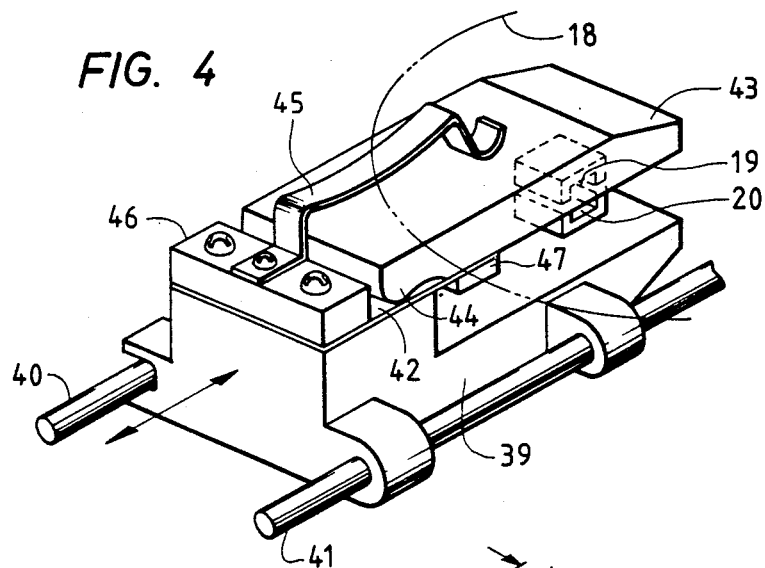
FIG. 4 is a perspective view showing an head-holding apparatus for holding the recording head devices of FIG. 3.

FIG. 4 shows a head-holding mechanism for holding the pair of recording devices 19 and 20 thereon. In FIG. 4, signals are recorded or reproduced on or from a floppy disc 18 in a state where the floppy disc 18 is held at its both surfaces between a pair of magnetic head devices 19 and 20 under a predetermined contact pressure, the floppy disc 18 being composed of a sheet made of Mylar having a thickness of approximately 0.08 mm, which sheet is coated by such a magnetic material as $\gamma$-$Fe_2O_3$ or the like on both the surfaces thereof. The recording head device 20 is securely mounted on a carriage 39 which is reciprocable through a coupling of guide rods 40 and 41 fixedly secured on a base (not shown) of a magnetic recording/reproducing apparatus. Another recording head device 19 is fixedly mounted, through a gimbal (not shown), on one end portion of an arm 43 pivotally connected to the carriage 39 through a flat spring 42. A circular arcuate pivotal portion 44 is formed on the other end portion of the arm 43 as a center for pivotal movement thereof and is so connected to the carriage 39 as to hold the flat spring 42 therebetween under the influence of a force exerted by a spring 45 which is disposed so as to hold the floppy disc 18 between the recording head devices 19 and 20 under the predetermined contact pressure. Pressing plates 46 and 47 are disposed to fix the flat spring 42 to the carriage 39 and the arm 43 respectively.

The contact pressure- of the recording head devices 19 and 20 applied relative to each other is used essentially in order to rectify a warp of the floppy disc 18 and a deformation thereof due to no agreement in position between the pair of recording head devices 19 and 20.

Figure 5:
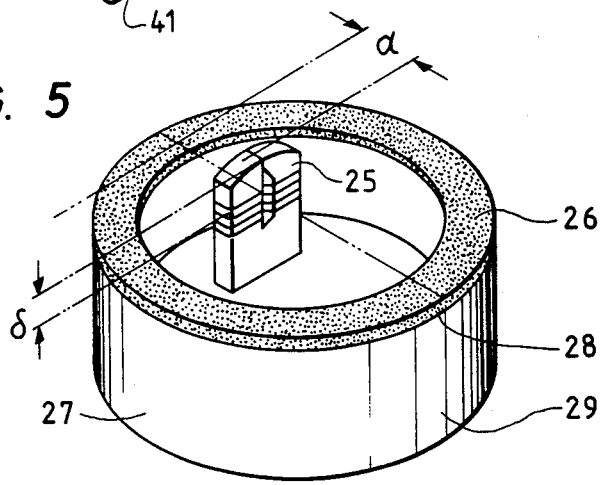
FIG. 5 is view showing another recording head device used in this embodiment thereof.

FIG. 5 is a perspective view showing another arrangement of each of the pair of recording head devices usable for an magnetic recording/reproducing apparatus of this invention. In FIG. 5, the recording head device 27 is constructed so that a sliding pad portion 29 is shaped cylindrically and surrounds a magnetic head chip 25 whose top portion is protruded by a predetermined amount from a contact surface 26 of the sliding pad portion 29, the contact surface 26 being formed by mounting a non-woven fabric 28 such as felts on the sliding pad portion 29. Another recording device may be constructed similarly, but the non-woven fabric 28 is not necessarily provided thereon.

In this case, since the non-woven fabric 28 is adhered on the sliding pad portion 29 so as to reduce the sliding friction produced between it and the floppy disc 18, it is not required that the sliding pad portion itself is made of barium titanate which is one of such ceramics as having a property difficult to be machined.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A magnetic recording/reproducing apparatus for recording information on and reproducing information from both sides of a disc-like magnetic recording medium rotatable about a dive shaft, said magnetic recording/reproducing apparatus comprising:
a first recording head device for recording information on and reproducing information from a first side of said recording medium, said first recording head device including:
a first magnetic head chip, and
a first sliding pad;
a second recording head device for recording information on and reproducing information from a second side of said recording medium, said second recording head device including:
a second magnetic head chip, and
a second sliding pad;
the recording head devices being disposed so as to slidably hold said recording medium therebetween under a predetermined contact pressure, each of said pair of recording head devices including a magnetic head chip and a sliding pad being arranged such that said magnetic head chip is surrounded at a predetermined interval by said sliding pad and the top portion of said magnetic head chip being disposed so as to protrude by a predetermined amount from a sliding surface of said sliding pad which comes into contact with said disc-like recording medium,
said pair of recording head devices being aligned with each other with said disc-like recording medium being held therebetween so that said magnetic head chips are arranged at different positions at the same interval with respect to said sliding pads in a radial direction of said disc-like recording medium and, when the interval from each of said magnetic head chips to each of said sliding pads is a and the interval between said magnetic head chips is b, the positions of said magnetic head chips with respect to said sliding pads are determined so as to satisfy the following relation, $$b/2 \leq a \leq b.$$

2. A magnetic recording/reproducing apparatus as claimed in claim 1, wherein each of said sliding pads is shaped cylindrically so as to place said magnetic head chip therein.

3. A magnetic recording/reproducing apparatus as claimed in claim 1, wherein said sliding surface of each of said sliding pads coming into contact with said disc-like recording medium is made of a non-woven fabric.

4. A magnetic recording/reproducing apparatus as claimed in claim 1, wherein said first and second recording head devices are aligned in a direction tangential to a circular track of said disc-like recording medium.

5. A magnetic recording/reproducing apparatus as claimed in claim 1, wherein said sliding surface of each of said sliding pads coming into contact with said disc-like recording medium is made of a ceramic.

* * * * *